US007132600B2

(12) United States Patent
Kaneko

(10) Patent No.: US 7,132,600 B2
(45) Date of Patent: Nov. 7, 2006

(54) ELECTRIC CONNECTION BOX

(75) Inventor: Nobutaka Kaneko, Ogasa-gun (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/294,424

(22) Filed: Dec. 6, 2005

(65) Prior Publication Data

US 2006/0121760 A1 Jun. 8, 2006

(30) Foreign Application Priority Data

Dec. 8, 2004 (JP) .......................... P2004-355423

(51) Int. Cl.
*H02G 3/04* (2006.01)

(52) U.S. Cl. ........................ 174/48; 174/66; 174/68.1; 220/241; 439/464

(58) Field of Classification Search ................. 174/66, 174/67, 48, 68.1, 58, 60, 47; 439/464, 472, 439/535; 220/4.02, 241, 242; 248/906
See application file for complete search history.

(56) References Cited

U.S. PATENT DOCUMENTS 4,842,549 A * 6/1989 Asick et al. ................ 439/464
5,942,724 A * 8/1999 Russo et al. .................. 174/48
6,042,243 A * 3/2000 Grill et al. .................. 362/125
6,045,394 A * 4/2000 Matsuoka et al. .......... 439/464
6,056,587 A 5/2000 Matsuoka et al.
6,180,878 B1 * 1/2001 Gretz .......................... 174/48
6,355,880 B1 * 3/2002 Bateson et al. ............... 174/48
6,936,766 B1 * 8/2005 Galasso ....................... 174/48
2002/0057360 A1 5/2002 Abe et al.

FOREIGN PATENT DOCUMENTS

EP 0 697 681 A2 2/1996
JP 6-48148 U 6/1994
JP 2000-261935 A 9/2000
JP 2000-316220 A 11/2000

* cited by examiner

*Primary Examiner*—Dhiru R. Patel
(74) *Attorney, Agent, or Firm*—Sughrue Mion, PLLC

(57) ABSTRACT

An electric connection box includes a box body and a lower cover. The box body includes a body portion on which a terminal end of a wire harness is adapted to be mounted, and a harness lead-out portion for receiving the wire harness. The lower cover includes a cover body attached to the body portion, and a lead-out cover attached to the harness lead-out portion. The cover body and the lead-out cover are separate from each other. The lead-out cover includes a harness receiving portion for receiving a second wire harness.

3 Claims, 2 Drawing Sheets

ELECTRIC CONNECTION BOX

BACKGROUND OF THE INVENTION

1. Field of the Invention

This invention relates to an electric connection box mounted on an automobile or the like serving as a mobile body.

2. Related Art

Generally, various electronic equipments, including lamps (such as headlamps and tail lamps) and motors (such as a starter motor and an air-conditioner motor), are mounted on an automobile serving as a mobile body.

Junction blocks have been mounted at suitable portions of the automobile in order to supply electric power to the above various electronic equipments. Various electric circuit units for many fuses, relays and so on are integrated into the junction block.

Such a junction block includes fuses, relays, bus bars and so on, and therefore is called a fuse block or a relay box, or is generically called an electric connection box. In the present specification, the above-mentioned fuse block, relay box and junction block will be generically referred to as "electric connection box" (see, for example, JP-UM-A-6-48148 Publication).

The electric connection box, shown in JP-UM-A-6-48148 Publication, includes a box body forming the contour, a wiring board, a lower cover (serving as a cover member) attached to the box body. Electric parts, such as fuses and relays, are mounted on the box body. Connectors of a wire harness and others are fitted to the box body.

The wiring board is received within the box body, and this wiring board electrically connect the electric parts (such as the fuses and relays) respectively to terminals of the connectors of the wire harness in predetermined patterns. The lower cover, when attached to the box body, covers the connectors of the wire harness.

A harness lead-out portion for leading the wire harness to the exterior is provided at the box body or the lower cover. This harness lead-out portion is in the form of a cross-sectionally circular hole, or is formed into an annular shape. The wire harness is passed through the interior of the harness lead-out portion, and is led to the exterior of the electric connection box.

A greater variety of equipments have now been mounted on an automobile on which the above-mentioned electric connection box is to be mounted. Therefore, it is desired that the electric connection box should be more compact in size, and for example, it is proposed to make the harness lead-out portion thinner by flattening its cross-sectional shape. In this case, the harness lead-out portion is made thinner, and therefore in the electric connection box of the above conventional structure, it is difficult to pass the wire harness through the harness lead-out portion at the time of attaching the lower cover to the box body after the connectors of the wire harness are fitted to the box body. Thus, in the electric connection box of the above conventional structure, when the harness lead-out portion is made thinner so as to achieve the compact design, the cover member (such as the lower cover) can not be easily attached to the box body, and it is thought that the assembling operation becomes difficult.

SUMMARY OF THE INVENTION

It is therefore an object of this invention to provide an electric connection box in which even if a harness lead-out portion is made thinner, a cover member can be easily attached to a box body.

(1) In order to solve the above problems and also to achieve the above object, the invention provides an electric connection box comprising a box body on which a terminal end of a wire harness is adapted to be mounted; and a cover member which is attached to the box body, and covers the terminal end of the wire harness when the cover member is attached to the box body; characterized in that the box body includes a body portion on which the terminal end of the wire harness is adapted to be mounted, and a harness lead-out portion which extends outwardly from the body portion, and is adapted to receive the wire harness; and the cover member includes a cover body attached to the body portion, and a lead-out cover which is separate from the cover body, and is attached to the harness lead-out portion.

(2) The electric connection box of the invention, is further characterized in that the harness lead-out portion is formed into a flattened shape.

(3) The electric connection box of the invention, is further characterized in that the lead-out cover includes a harness passage portion for the passage of a second wire harness therethrough, the second wire harness being separate from the wire harness.

In the electric connection box of the invention, the cover member may be divided into the cover body for being attached to the box body and the lead-out cover for being attached to the harness lead-out portion. Therefore, first, the cover body is attached to the body portion, and then the wire harness is received in the harness lead-out portion, and thereafter the lead-out cover can be attached to the harness lead-out portion.

In the electric connection box of the invention, the harness lead-out portion may have the flattened shape, and therefore this harness lead-out portion can be formed into a compact design.

In the electric connection box of the invention, the harness passage portion for the passage of the second wire harness therethrough may be provided at the lead-out cover of the cover member, and therefore the wire harness (which is mounted at its terminal end on the box body) and the second wire harness can be mounted separately from each other.

As described above, in the invention, the cover body and the lead-out cover of the cover member are sequentially attached to the box body, and therefore the lead-out cover can be attached to the box body after the wire harness is positively received in the harness lead-out portion. Therefore, even if the harness lead-out portion is made thin, the wire harness will not interfere with the operation for combining the cover member and the box body with each other. Therefore, even if the harness lead-out portion is made thin, the cover member and the box body can be easily combined together without interference by the wire harness.

In the invention, the harness lead-out portion is flattened, and therefore the harness lead-out portion and hence the electric connection box can be formed into the compact design.

In the invention, the wire harness (which is mounted at its terminal end on the box body) and the second wire harness can be mounted separately from each other. Therefore, even if the harness lead-out portion is made thin, the wire harness and the second wire harness will not interfere with the operation for combining the cover member and the box body with each other. Therefore, even if the harness lead-out portion is made thin, the cover member and the box body can be easily combined with each other without interference by the wire harnesses.

DETAILED DESCRIPTION OF THE PREFERRED EMBODIMENTS

One preferred embodiment of an electric connection box of the present invention will now be described with reference to FIGS. 1 and 2.

Figure 1:
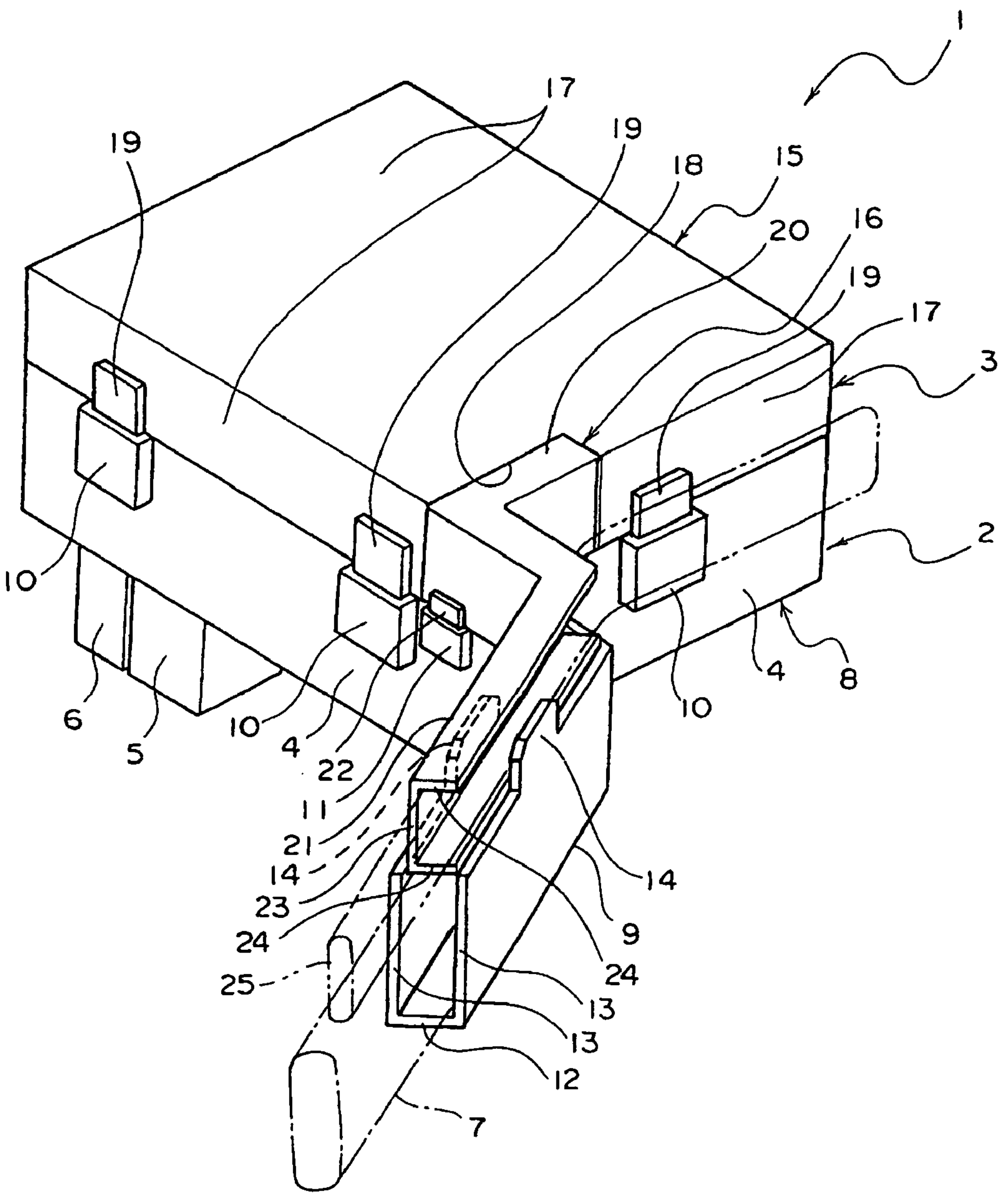
FIG. 1 is a perspective view of one preferred embodiment of an electric connection box of the present invention.

The electric connection box 1 of this embodiment, shown in FIG. 1, is mounted on an automobile serving as a mobile body. As shown in FIGS. 1 and 2, the electric connection box 1 comprises a box body 2, a wiring board (not shown), and a lower cover 3 serving as a cover member.

The box body 2 is made of an insulative synthetic resin, and is molded by well-known injection molding. The box body 2 includes a body portion 8 of a tubular shape (box-shape) formed by a plurality of outer walls 4, and a harness lead-out portion 9 which is formed integrally with and extends from the body portion 8.

Figure 2:
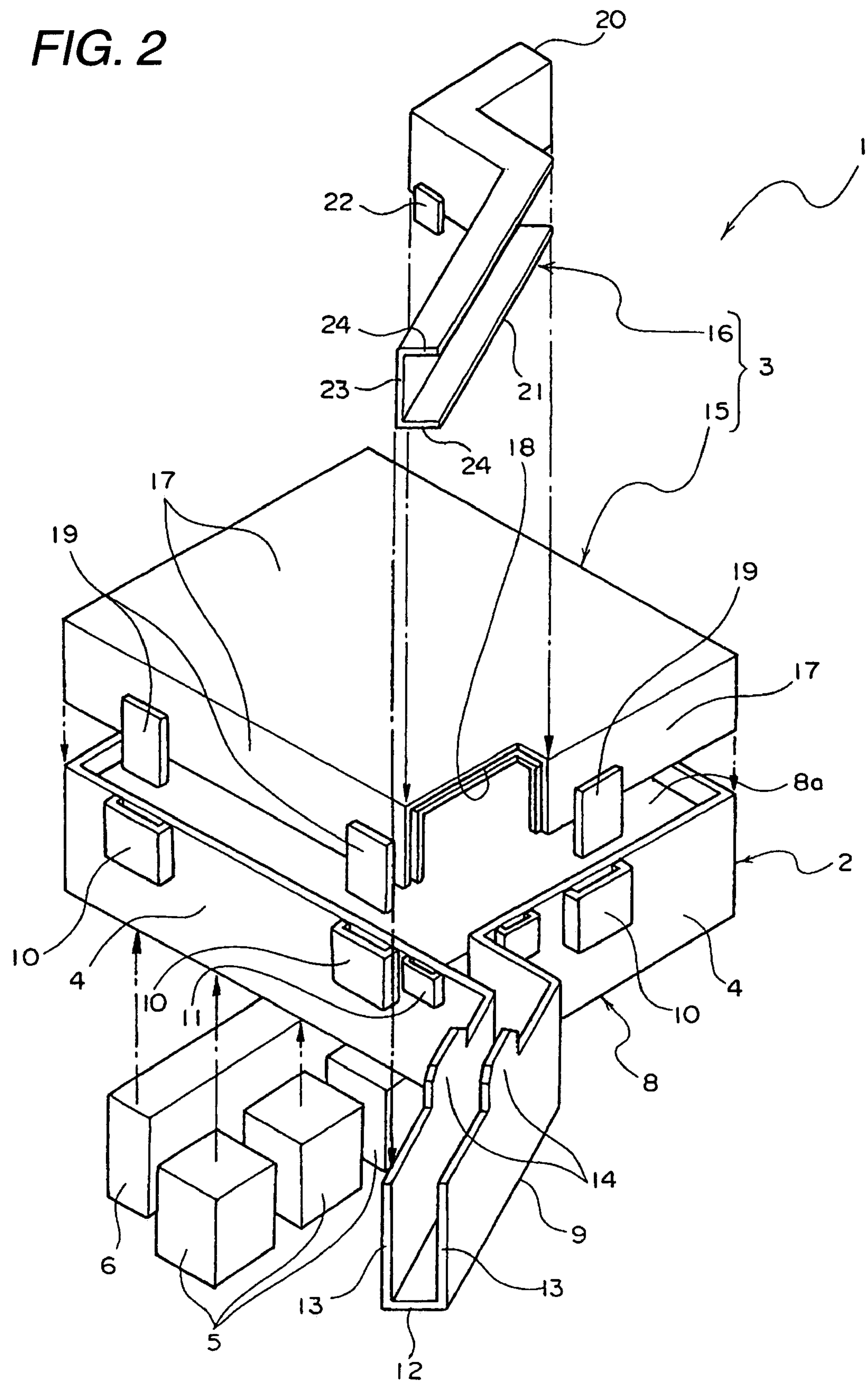
FIG. 2 is an exploded, perspective view of the electric connection box of FIG. 1.

A plurality of mounting portions (on which electric parts, such as relays 5 and a fusible link 6, are mounted) are provided on a surface (serving as an upper surface) of the body portion 8 which is disposed at the lower side in FIGS. 1 and 2. Connectors of a wire harness 7 (indicated in dot-and-dash lines in FIG. 2) which is to be installed in the automobile are fitted to a lower surface-8-of the body portion 8 which is disposed at the upper side in FIGS. 1 and 2. The wiring board is received within the body portion 8.

The wire harness 7 comprises a plurality of wires, and the connectors connected to ends of the wires. The connectors are fitted to various electronic equipments, mounted on the automobile, and the body portion 8 of the box body 2. Therefore, a terminal end of the wire harness 7 is mounted on the lower surface 8*a* of the body portion 8 of the box body 2.

Retaining portions 10 for a cover body 15 (described later) and retaining portions 11 for a lead-out cover 16 (described later) are formed on the outer walls 4 of the body portion 8.

The harness lead-out portion 9 is formed into a trough-like shape, and is integrally connected at its one longitudinal end to a corner portion of the body portion 8. The harness lead-out portion 9 is open to the interior of the body portion 8. The harness lead-out portion 9 extends outwardly from the body portion 8.

The harness lead-out portion 9 includes a bottom plate 12, and a pair of side plates 13 extending perpendicularly respectively from opposite side edges of the bottom plate 12. The cross-section of the harness lead-out portion 9 has an elongated U-shape whose height (in FIGS. 1 and 2) is larger than its width. The bottom plate 12 is formed on that edge of the body portion 8 of the box body 2 remote from the lower cover 3. The side plates 13 extend from the bottom plate 12 toward the lower cover 3.

The height (in FIGS. 1 and 2) of the harness lead-out portion 9 is made larger than the width thereof to such a degree that the wire harness 7 can not be easily inserted into the harness lead-out portion 9. Thus, the difference between the dimension in one direction and the dimension in a direction perpendicular to the one direction is made large to such a degree that the wire harness 7 can not be easily inserted into the harness lead-out portion 9, and this will be expressed by the description "the harness lead-out portion 9 is formed into a flattened shape". Thus, the harness lead-out portion 9 is formed into such a flattened shape that the wire harness 7 can not be easily inserted into the harness lead-out portion 9. Therefore, the term "the harness lead-out portion is flattened", used in the present specification, means that the harness lead-out portion 9 is flattened to such a degree that the wire harness 7 can not be easily inserted into the harness lead-out portion 9.

The harness lead-out portion 9 receives the wire harness 7, and leads this wire harness 7 to the exterior of the body portion 8. The harness lead-out portion 9, together with the wire harness 7, a harness receiving portion 21 (described later) and a second wire harness 25 (described later), is wound with a tape, and is fixed to them. The harness lead-out portion 9 has positioning piece portions 14 formed on and projecting from the side plates 13 of the harness lead-out portion 9, respectively. The positioning piece portions 14, extending respectively form the side plates 13, are disposed in parallel relation to each other. The positioning piece portions 14 hold the lead-out cover 16 therebetween to position the same.

The wiring board is provided with electrically-conductive bus bars, and insulating plates. The bus bars are obtained by pressing (or blanking) an electrically-conductive sheet. There are provided the plurality of bus bars. The plurality of bus bars are stacked together. The insulating plates are disposed between the stacked bus bars and also at other portions, and prevent the bus bars from being electrically connected together at their undesired portions (that is, from short-circuiting to each other), and also position the bus bars.

The wiring board is received within the body portion 8 of the box body 2. When the wiring board is received within the body portion 8 of the box body 2, the bus bars electrically connect the connectors of the wire harness 7 to the electric parts (such as the relays 5 and the fusible link 6 mounted on the mounting portions) in predetermined patterns. Thus, the electric parts (such as the relays 5 and the fusible link 6) are connected to the terminal end of the wire harness 7 via the wiring board.

The lower cover 3 includes the cover body 15, and the lead-out cover 16 separate from the cover body 15. The cover body 15 is made of an insulative synthetic resin or the like, and is molded by known injection molding. The cover body 15 includes a plurality of outer walls 17 connected together, and is in the form of a flattened tube with a closed bottom. A notch 18 is formed in a corner portion of this cover body 15. The notch 18 is juxtaposed to the proximal end of the harness lead-out portion 9 in a direction of superposing of the lower cover 3 on the box body 2. The notch 18 is formed in the outer walls 17 which merge into the above-mentioned corner portion of the cover body 15.

Retaining portions 19 for retaining engagement respectively with the retaining portions 10 on the body portion 8 of the box body 2 are formed on the outer walls 17 of the cover body 15. When the retaining portions 10 are retainingly engaged with the retaining portions 19, respectively, each side wall (outer wall) 4 of the box body 2 is disposed substantially flush with the corresponding side wall (outer wall) 17. The cover body 15 is attached to the body portion 8 of the box body 2, with the retaining portions 19 retainingly engaged respectively with the retaining portions 10 on the body portion 8 of the box body 2, in such a manner that this cover body 15 covers the lower surface 8*a* of the body portion 8 of the box body 2, that is, the terminal end of the wire harness 7.

When the body portion 8 of the box body 2 and the cover body 15 of the lower cover 3 are to be combined together, the body portion 8 of the box body 2 and the cover body 15 of the lower cover 3 are moved toward each other along directions of arrows K which are perpendicular to the upper surface and lower surface 8*a* of the body portion 8. These arrows K indicate the direction of movement of the body portion 8 (of the box body 2) and the cover body 15 (of the lower cover 3) toward each other.

The lead-out cover 16 includes a box-like mounting portion 20, and the trough-like harness receiving portion 21 serving as a harness passage portion. The mounting portion 20 has retaining portions 22 for retaining engagement respectively with the retaining portions 11. The mounting portion 20 is attached to the cover body 15 and the body portion 8, with the retaining portions 22 retainingly engaged respectively with the retaining portions 22 retainingly engaged respectively with the retaining portions 11 on the body portion 8 of the box body 2, in such a manner that this mounting portion 20, together with the body portion 8 of the box body 2, covers the notch 18 formed in the cover body 15.

The harness receiving portion 21 is integrally connected at its one end to the mounting portion 20. When the mounting portion 20 is attached to the body portion 8, the harness receiving portion 21 extends outwardly from the outer surface of the body portion 8. The harness receiving portion 21 includes a bottom plate 23, and a pair of side plates 24 extending perpendicularly from opposite side edges of the bottom plate 23. Thus, the harness receiving portion 21 has a trough-like shape, and therefore has a U-shaped cross-section. When viewed from the top or the bottom, the harness receiving portion 21 and the harness lead-out portion 9 are generally equal in shape to each other.

When the mounting portion 20 is attached to the body portion 8 of the box body 2, one side plate 24 of the harness receiving portion 21 is inserted between the pair of positioning piece portions 14 to close an opening between the pair of side plates 13 of the harness lead-out portion 9. Namely, when the mounting portion 20 is attached to the body portion 8 of the box body 2, the one side plate 24 of the harness receiving portion 21 is positioned between the pair of positioning piece portions 14, and closes the open side of the harness lead-out portion 9. The harness receiving portion 21 is not open to the interior of the cover body 15 and hence to the interior of the body portion 8 of the box body 2. In this manner, the harness receiving portion 21, that is, the lead-out cover 16, is attached to the harness lead-out portion 9.

The second wire harness 25 (indicated in dots-and-dash lines in FIG. 1) separate from the wire harness 7, is received in the harness receiving portion 21. The harness receiving portion 21, together with the wire harness 7, the harness lead-out portion 9 and the second wire harness 25, is wound with the tape, and is fixed to them. The second wire harness 25 is installed in the automobile, and is received in the harness receiving portion 21, and is not electrically connected to the bus bars of the wiring board and the electric parts (such as the relays 5 and the fusible link 6) of the electric connection box 1. Thus, the second wire harness 25 passes through the electric connection box 1 without electrical contact therewith.

The above electric connection box 1 is assembled in the following manner. First, the wiring board is received within the body portion 8 of the box body 2, and the electric parts (such as the fusible link 6 and the relays 5) are mounted on the respective mounting portions formed at the upper surface of the body portion 8 of the box body 2. Then, the connectors of the wire harness 7 are fitted to the lower surface 8*a* of the body portion 8 of the box body 2, so that the terminal end of the wire harness 7 is mounted on the lower surface 8*a* of the body portion 8.

The wire harness 7 is inserted into the harness lead-out portion 9, and the cover body 15 is attached to the body portion 8 of the box body 2. Then, the lead-out cover 16 is attached to the body portion 8 and the harness lead-out portion 9 of the box body 2. Then, the second wire harness 25 is received in the harness receiving portion 21. The tape is wound on the harness lead-out-portion 9, the harness receiving portion 21 and the wire harnesses 7 and 25, and fix them to one another.

Thus, the electric connection box 1 is assembled, and is mounted on the automobile. The electric connection box 1 electrically connects the electronic equipments of the automobile respectively to the electric parts (such as the fusible link 6 and the relays 5) in the predetermined patterns.

In this embodiment, the lower cover 3 is divided into the cover body 15 for being attached to the body portion 8 of the box body 2 and the lead-out cover 16 for being attached to the harness lead-out portion 9 of the box body 2. Therefore, first, the cover body 15 is attached to the body portion 8, and then the wire harness 7 is received in the harness lead-out portion 9, and thereafter the lead-out cover 16 can be attached to the harness lead-out portion 9.

Thus, the cover body 15 and the lead-out cover 16 of the lower cover 3 are sequentially attached to the box body 2, and therefore the lead-out cover 16 can be attached to the box body 2 after the wire harness 7 is positively received in the harness lead-out portion 9. Therefore, even if the harness lead-out portion 9 is made thin, the wire harness 7 will not interfere with the operation for combining the lower cover 3 and the box body 2 with each other. Therefore, even if the harness lead-out portion 9 is made thin, the lower cover 3 and the box body 2 can be easily combined together without interference by the wire harness 7.

The harness lead-out portion 9 is flattened, and therefore the harness lead-out portion 9 and hence the electric connection box 1 can be formed into a compact design.

The harness receiving portion 21 for the passage of the second wire harness 25 therethrough is provided at the lead-out cover 16 of the lower cover 3, and therefore the wire harness 7 (which is mounted at its terminal end on the body portion 8 of the box body 2) and the second wire harness 25 can be mounted separately from each other. Therefore, even if the harness lead-out portion 9 is made thin, the wire harness 7 and the second wire harness 25 will not interfere with the operation for combining the lower cover 3 and the box body 2 with each other. Therefore, even if the harness lead-out portion 9 is made thin, the lower cover 3 and the box body 2 can be easily combined with each other without interference by the wire harnesses 7 and 25.

The above embodiment merely shows a representative example of the present invention, and the invention is not limited to the above embodiment. Namely, various modifications can be made without departing from the subject matter of the invention.

What is claimed is:

1. An electric connection box comprising:

a box body on which a terminal end of a wire harness is adapted to be mounted; and a cover member which is attached to said box body, and covers the terminal end of said wire harness when said cover member is attached to said box body;

wherein said box body includes a body portion on which the terminal end of said wire harness is adapted to be mounted, and a harness lead-out portion which extends outwardly from said body portion, and is adapted to receive said wire harness; and said cover member includes a cover body attached to said body portion, and a lead-out cover which is separate from said cover body, and is attached to said harness lead-out portion.

2. An electric connection box according to claim 1, wherein said harness lead-out portion is formed into a flattened shape.

3. An electric connection box according to claim 1, wherein said lead-out cover includes a harness passage portion for the passage of a second wire harness therethrough, said second wire harness being separate from said wire harness.

* * * * *